US011981132B2

(12) United States Patent
Kitai

(10) Patent No.: US 11,981,132 B2
(45) Date of Patent: May 14, 2024

(54) RECORDING APPARATUS

(71) Applicant: CANON KABUSHIKI KAISHA, Tokyo (JP)

(72) Inventor: Satoshi Kitai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 17/850,777

(22) Filed: Jun. 27, 2022

(65) Prior Publication Data

US 2022/0410568 A1 Dec. 29, 2022

(30) Foreign Application Priority Data

Jun. 28, 2021 (JP) ................................. 2021-106349

(51) Int. Cl.
*B41J 2/045* (2006.01)
*B41J 2/145* (2006.01)

(52) U.S. Cl.
CPC ....... *B41J 2/04591* (2013.01); *B41J 2/04586* (2013.01); *B41J 2/145* (2013.01)

(58) Field of Classification Search
CPC ........ B41J 2/1433; B41J 2/162; B41J 2/1626; B41J 2/04591; B41J 2/04586; B41J 2/145
See application file for complete search history.

(56) References Cited

U.S. PATENT DOCUMENTS 6,312,099 B1 * 11/2001 Hawkins .............. B41J 2/04505 347/42
7,393,078 B2 * 7/2008 Yazawa .................. B41J 2/2132 347/14
7,585,039 B2 * 9/2009 Ochiai ................... B41J 2/2132 347/43

FOREIGN PATENT DOCUMENTS

JP 6470570 B2 2/2019

* cited by examiner

*Primary Examiner* — Thinh H Nguyen
(74) *Attorney, Agent, or Firm* — Canon U.S.A., Inc. I.P. Division

(57) ABSTRACT

In at least one embodiment, a number of nozzle rows in a first area on a side of one end of a first substrate closest to one end of a print head is set to be lower than a number of nozzle rows on a central side of the print head relative to the first area, and energy for driving the element on the first substrate is set to be larger than energy for driving the element on a second substrate on the central side of the print head relative to the first substrate to set a dot to be formed on the recording medium by ink discharged from a nozzle in the first area to be larger than a dot to be formed on the recording medium by ink discharged from a nozzle in the second substrate.

14 Claims, 12 Drawing Sheets

RECORDING APPARATUS

BACKGROUND OF THE INVENTION

Field of the Invention

The present disclosure relates to a recording apparatus.

Description of the Related Art

In recent years, a full-line print head obtained by arranging plural pieces of element substrates to have a recording width equivalent to a width of a recording medium has been used. Japanese Patent No. 6470570 is related to a configuration of a full-line print head formed by arranging, in proximity to each other, plural pieces of element substrates each of which has a parallelogram shape to be set in an array in a single row in a recording width direction. FIG. 12 is a schematic diagram illustrating a configuration of the full-line print head formed by arranging the plural pieces of element substrates to be set in an array in a single row in the recording width direction. As illustrated in FIG. 12, each of element substrates 502 with a parallelogram shape includes a plurality of recording element rows 504, and each signal and electric power source are supplied from a recording apparatus (not illustrated) via a connector 503 and a head wiring 506 to an electrode pad 505. In addition, a size (H) of one side of a print head 501 can be decreased by coupling and arranging the element substrates 502 (in this example, four element substrates) in a single row. A joining portion between each of element substrates 502 has a shape angled relative to a recording width direction (W), and the plurality of element substrates 502 can be arranged in proximity to each other, so that the number of recording elements arranged in an overlapping manner in the joining portion between the element substrates 502 can be reduced.

In the case of Japanese Patent No. 6470570, since each of element substrates of the print head has a parallelogram shape, end portions of the element substrates at both ends in the width direction of the print head have fewer rows of nozzles as compared with a central portion. For this reason, to satisfy desired throughput, when the end portions with the fewer rows of nozzles are not to be used, a printable area is narrowed.

SUMMARY OF THE INVENTION

The present disclosure is directed to embodiments that have been made in view of the above-described circumstances, and aims at satisfying desired throughput while securing a wider printable area of a print head than has been secured before.

At least one embodiment of a recording apparatus includes a print head including a plurality of nozzle rows including an array of nozzles each of which is arranged to discharge ink, and a plurality of substrates on which, for each of the nozzles, an element configured to generate energy used for discharging the ink from the nozzle is provided, where a relative movement between the print head and a recording medium is operated in a predetermined direction to perform recording on the recording medium, and a range exists where the nozzles are provided in an intersecting direction which intersects with the predetermined direction varying between the plurality of nozzle rows arranged in the predetermined direction in each of the plurality of substrates, in which a number of nozzle rows in a first area on a side of one end of a first substrate closest to one end of the print head in the intersecting direction is set to be lower than a number of nozzle rows on a central side of the print head relative to the first area, and energy for driving the element on the first substrate is set to be larger than energy for driving the element on a second substrate on the central side of the print head relative to the first substrate to set a dot to be formed on the recording medium by the ink discharged from the nozzle in the first area to be larger than a dot to be formed on the recording medium by the ink discharged from the nozzle in the second substrate.

According to other aspects of the present disclosure, one or more additional recording apparatuses and one or more methods are discussed herein. Further features of the present disclosure will become apparent from the following description of exemplary embodiments with reference to the attached drawings.

DESCRIPTION OF THE EMBODIMENTS

Embodiments will be described with reference to the drawings. In one or more drawings, arrows X and Y indicate a respective horizontal direction and are orthogonal to each other. An arrow Z indicates a vertical direction.

Recording System

Figure 1:
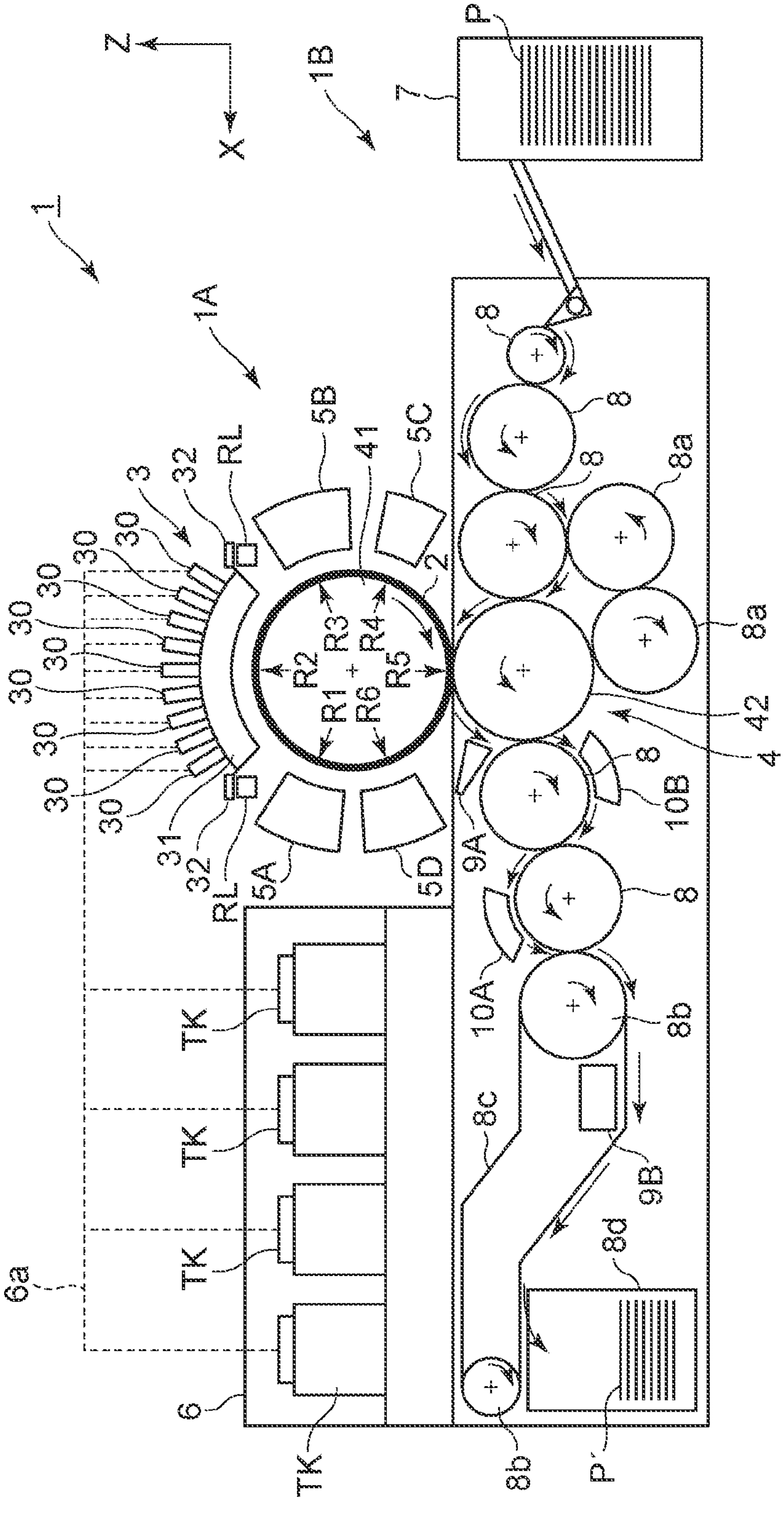
FIG. 1 is an outline diagram of a recording system according to at least one embodiment of the present disclosure.

FIG. 1 is a front view schematically illustrating a recording system 1 according to at least one embodiment of the present disclosure. The recording system 1 is an ink jet printer based on a sheet feeding method which is configured to produce a record product P' by transferring an ink image onto a recording medium P via a transfer body 2. The recording system 1 includes a recording apparatus 1A and a conveyance apparatus 1B. According to at least the present embodiment, an X direction, a Y direction, and a Z direction respectively indicate a width direction (overall length direction), a depth direction, and a height direction of the recording system 1. The recording medium P is conveyed in a predetermined direction (herein, the X direction).

It is noted that "recording" includes not only a case where meaningful information such as a character or a graphic form is formed, but also irrespective of being meaningful or meaningless, a case where an image, a design, a pattern, or the like is widely formed on a recording medium, or a medium is processed. It does not matter whether it is an elicitation such that a person may visibly perceive the recording or not. In addition, according to at least the present embodiment, sheet-like paper is assumed as the "recording medium", but cloth, plastic/film, or the like may also be used in at least the present embodiment or one or more other embodiments of the present disclosure.

Components of ink are not particularly limited, but according to the present embodiment, a case of using aqueous pigment ink containing pigment that is a coloring material, water, and resin will be assumed. One or more inks or other types of inks may be used for at least the embodiment or other embodiments of the present disclosure.

Recording Apparatus

The recording apparatus 1A includes a recording unit 3, a transfer unit 4, and peripheral units 5A to 5D, and a supply unit 6.

Recording Unit

Figure 2:
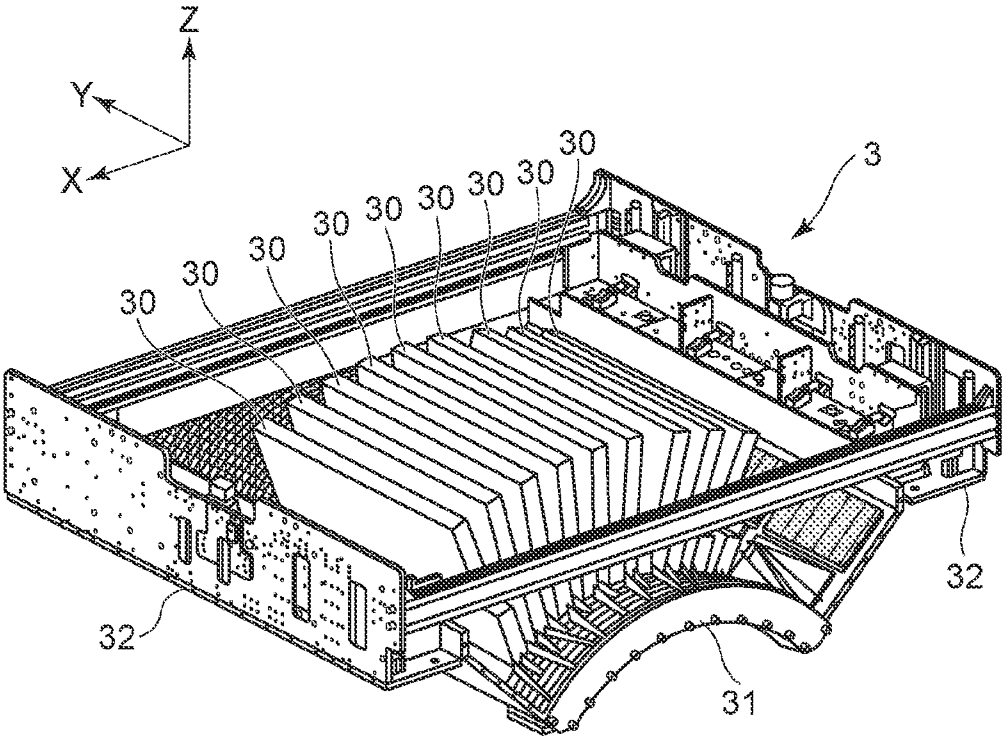
FIG. 2 is a perspective view of a recording unit according to the at least one embodiment or other embodiments of the present disclosure.

The recording unit 3 includes a plurality of print heads 30 and a carriage 31. References will be made to FIG. 1 and FIG. 2. FIG. 2 is a perspective view of the recording unit 3. The print head 30 discharges liquid ink onto the transfer body 2 that moves in the X direction relative to the print head 30, and forms an ink image of a recorded image on the transfer body 2.

In the case of at least the present embodiment, each of the print heads 30 is a full-line head extending in the Y direction intersecting with the X direction at right angles, and nozzles are arrayed in a range covering a width of an image print region of a recording medium having a maximum usable size. The print head 30 has an ink discharge surface formed with nozzle openings on its bottom surface, and the ink discharge surface faces a front surface of the transfer body 2 with a minute gap (for example, several mm) therebetween. In the case of at least the present embodiment, since the transfer body 2 has a configuration to circularly move on a circular orbit, the plurality of print heads 30 are radially arranged.

A discharge element is provided to each of the nozzles. The discharge element is, for example, an element that generates a pressure in the nozzle and causes ink in the nozzle to be discharged, and a technology of an inkjet head of an ink jet printer in related art can be applied to the discharge element. The discharge element includes, for example, an element that causes film boiling in ink by an electrothermal converter, and forms air bubble(s) to discharge ink, an element that discharges ink by an electromechanical converter, an element that uses static electricity to discharge ink, and the like. The discharge element using the electrothermal converter can be used from the viewpoint of recording at a high speed and a high density.

In the case of at least the present embodiment, nine pieces of the print heads 30 are provided. Each of the print heads

30 discharges mutually different types of ink. The different types of ink are, for example, ink with different coloring materials, and are ink such as yellow ink, magenta ink, cyan ink, and black ink. The single print head 30 discharges one type of ink, but the single print head 30 may have a configuration to discharge plural types of ink. In a case where the plurality of print heads 30 are provided as described above, some of those print heads may also discharge ink (for example, clear ink) which does not contain a coloring material.

Figure 3A:
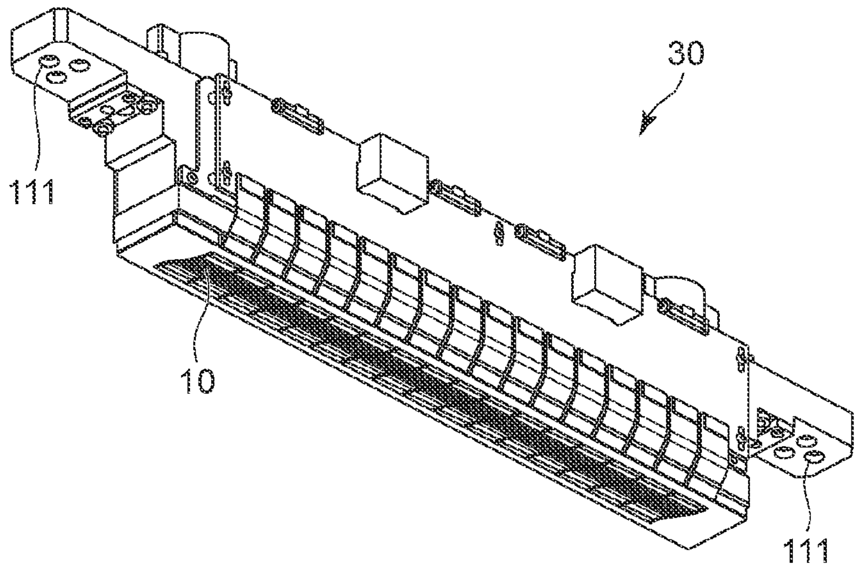
FIGS. 3A and 3B are perspective views illustrating a configuration of a print head according to the at least one embodiment or other embodiments of the present disclosure.

As illustrated in FIG. 3A, connection portions 111 provided at both end portions of the print head 30 are connected to an ink supply mechanism of the recording apparatus. With this configuration, ink is supplied from the ink supply mechanism to the print head 30, and the ink passing inside the print head 30 is to be collected to the ink supply mechanism. In this manner, the ink can circulate via a path of the ink supply mechanism and a path of the print head 30.

Figure 3B:
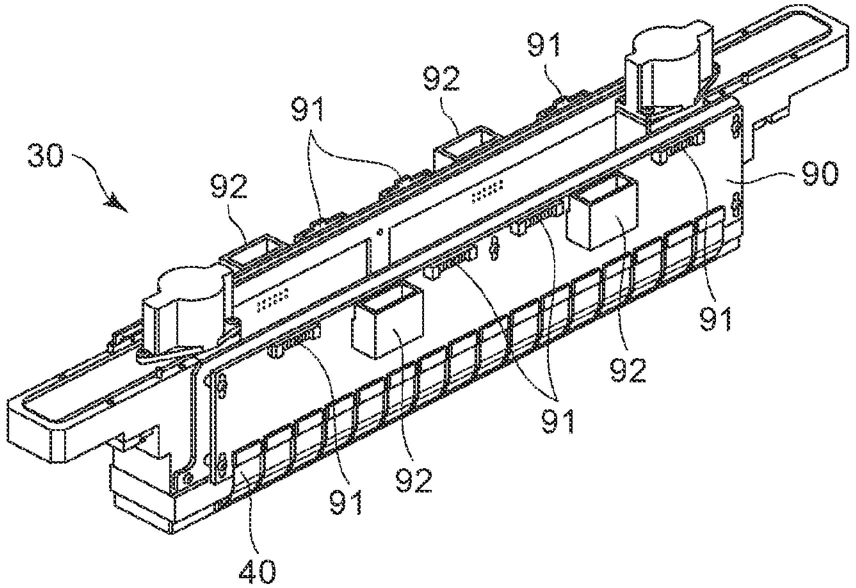

As illustrated in FIG. 3B, the print head 30 is provided with signal input terminals 91 and power source terminals 92 which are electrically connected via each of element substrates 10, a flexible wiring substrate 40, and an electric wiring substrate 90. The signal input terminals 91 and the power source terminals 92 are electrically connected to a recording control unit 15A of the recording apparatus, and respectively supply the element substrates 10 with a drive signal and electric power used for the discharge. By putting wirings together by an electric circuit in the electric wiring substrate 90, the number of the signal input terminals 91 and the number of the power source terminals 92 can be reduced as compared with the number of the element substrates 10. With this configuration, the number of electric connection portions is low which are to be detached when the print head 30 is attached to the recording unit 3 or when the print head 30 is replaced.

It is noted that according to at least this embodiment, an ink circulation type print head is used, but an ink consumption type print head in related art without an ink circulation mechanism may also be used.

In a case where a plurality of head chips are arranged in a predetermined direction to configure a full-line head with a still longer recording width than before while nozzle pitches are evenly spaced, a joint appears between the head chips.

To effectively use all the nozzles mounted in the head chips, according to at least this embodiment, a head chip with a parallelogram shape may be adopted.

Control Unit

Figure 4:
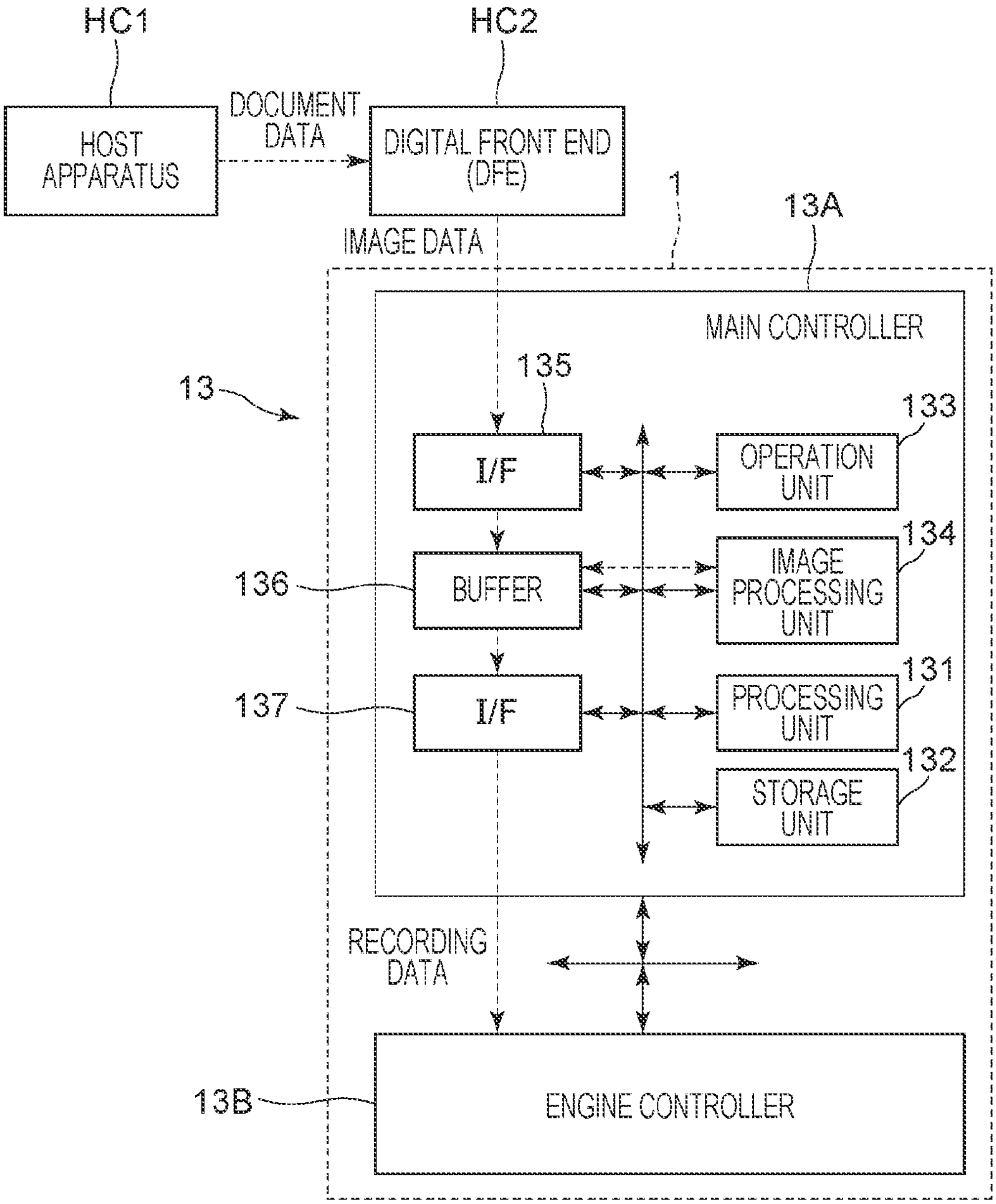
FIG. 4 is a block diagram of a control system of the recording system according to the at least one embodiment or other embodiments of the present disclosure.
Figure 5:
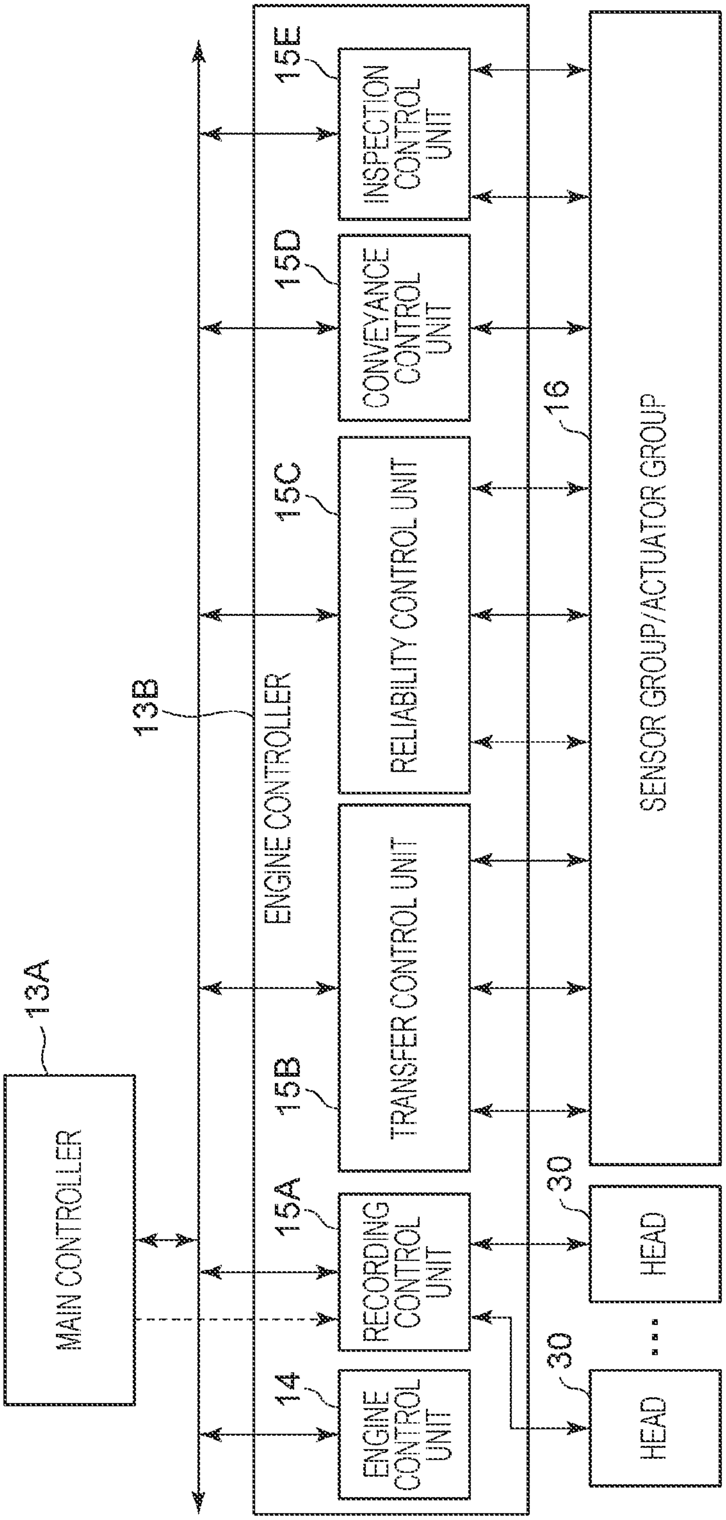
FIG. 5 is a block diagram of the control system of the recording system according to the at least one embodiment or other embodiments of the present disclosure.

Next, a control unit of the recording system 1 will be described. FIG. 4 and FIG. 5 are block diagrams of a control unit 13 of the recording system 1. The control unit 13 is connected to be in communication with a digital front end (DFE) HC2, and in addition, the digital front end HC2 is connected to be in communication with a host apparatus HC1.

In the host apparatus HC1, document data serving as a base of a recorded image is generated or saved.

The document data mentioned herein is, for example, generated in a format of an electronic file such as a document file or an image file. This document data is transmitted to the digital front end HC2, and the digital front end HC2 converts the received document data into a data format usable in the control unit 13 (for example, into RGB data for representing an image in an RGB format). The data after the conversion is transmitted as image data from the digital front end HC2 to the control unit 13, and the control unit 13 starts a recording operation based on the received image data.

In at least the case of the present embodiment, the control unit 13 is broadly classified into a main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor such as a CPU, and is configured to execute a program stored in the storage unit 132 and perform control of the entirety of the main controller 13A. The storage unit 132 is a storage device such as a RAM, a ROM, a hard disc, or an SSD, and stores a program to be executed by the CPU 131 and data. In addition, the storage unit 132 provides a work area to the CPU 131. The operation unit 133 is, for example, an input device such as a touch panel, a keyboard, or a mouse, and accepts an instruction of a user.

The image processing unit 134 is, for example, an electronic circuit having an image processing processor, or a processing circuit for image processing. The buffer 136 is, for example, a RAM, a hard disc, or an SSD. The communication I/F 135 communicates with the digital front end HC2, and the communication I/F 137 communicates with the engine controller 13B. Broken line arrows in FIG. 4 exemplify flows of the processing of the image data for one or more embodiments. The image data received from the digital front end HC2 via the communication I/F 135 is accumulated in the buffer 136. The image processing unit 134 reads out the image data from the buffer 136, and applies predetermined image processing to the read image data to store the image data in the buffer 136 again. The image data after the image processing which has been stored in the buffer 136 is transmitted as recording data to be used by a print engine from the communication IF 137 to the engine controller 13B.

As illustrated in FIG. 5, the engine controller 13B includes control units 14 and 15A to 15E to obtain detection results of a sensor group and actuator group 16 included in the recording system 1 and to perform drive control. Each of these control units 14 and 15A to 15E includes a processor such as a CPU, a storage device such as a RAM or a ROM, and an interface with an external device. It is noted that segmentation of the control units is an example. Some control may be executed by a plurality of further segmentalized control units. In contrast, a configuration may also be adopted where a plurality of control units are integrated with each other, and a single control unit may perform those control contents.

The engine control unit 14 performs control on an entirety of the engine controller 13B. The recording control unit 15A converts the recording data received from the main controller 13A into a data format such as raster data which is appropriate to driving of the print head 30. The recording control unit 15A performs discharge control of each of the print heads 30.

The transfer control unit 15B performs control of an application unit 5A, control of a suction unit 5B, control of a heating unit 5C, and control of a cleaning unit 5D. See, for example, at least one embodiment using several peripheral units, such as, the application unit 5A, the suction unit 5B, the heating unit 5C, and the cleaning unit 5D in FIG. 1.

The reliability control unit 15C performs control of the supply unit 6, control of a recovery unit 12, and control of a driving mechanism for moving the recording unit 3 between a discharge position POS1 and a recovery position POS3.

The conveyance control unit 15D performs drive control of the transfer unit 4 and control of the conveyance apparatus 1B. An inspection control unit 15E performs control of an inspection unit 9B and control of an inspection unit 9A.

The sensor group out of the sensor group and actuator group 16 includes a sensor that detects a position and a speed of a movable portion, a sensor that detects a temperature, an image pickup element, and the like. The actuator group includes a motor, an electromagnetic solenoid, an electromagnetic valve, and the like.

Figure 7A:
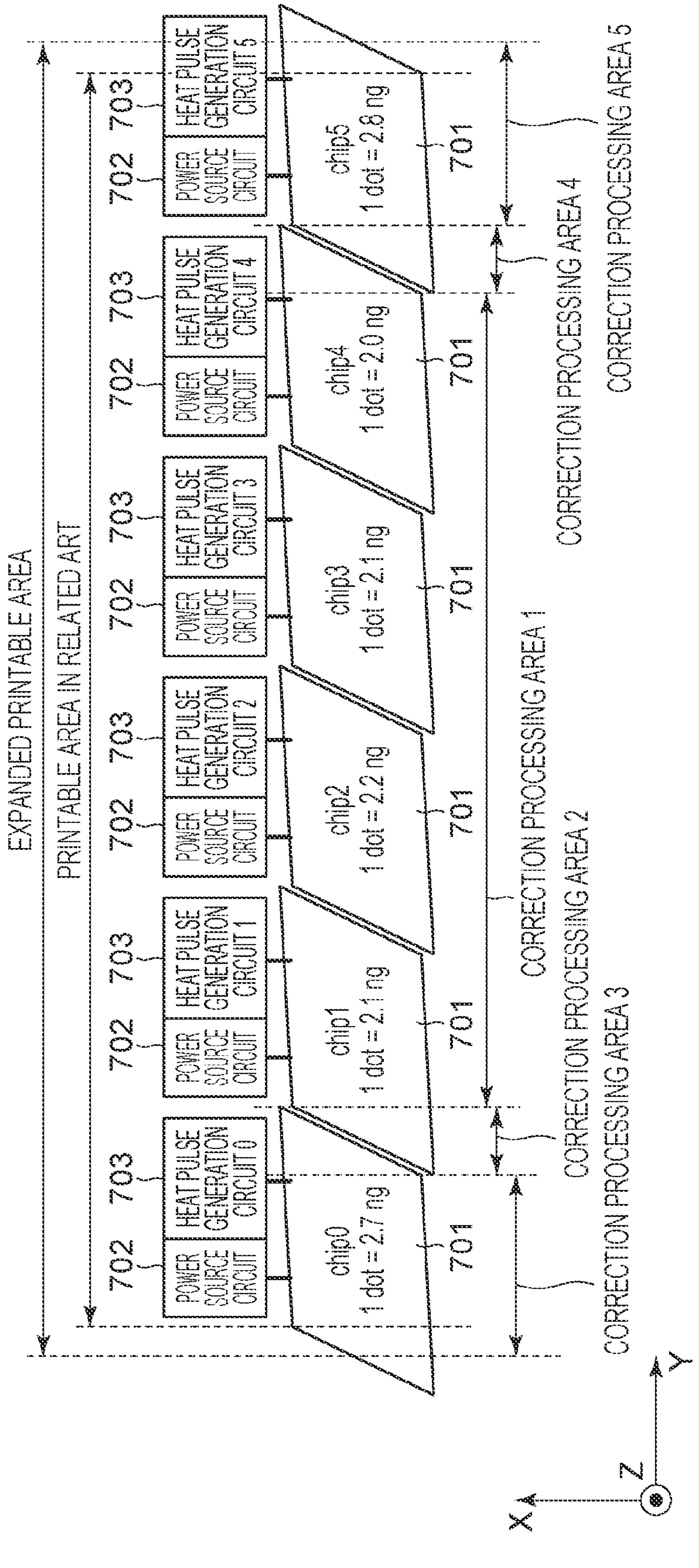
FIGS. 7A, 7B, and 7C are configuration diagrams in which an expanded printable area is realized by adjusting discharge amounts for one or more embodiments of the present disclosure.
Figure 7B:
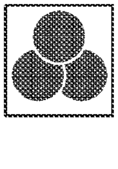
Figure 7C:
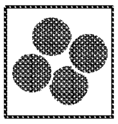

FIGS. 7A, 7B, and 7C are schematic diagrams for describing a printable area of the full-line print head according to at least the present embodiment or other embodiments of the present disclosure. Six element substrates 701 including CHIP0 to CHIP5 are coupled to each other. A power source circuit 702 and a heat pulse generation circuit 703 are individually connected to each of the element substrates, so that a power source voltage and a shape of a heat pulse can be individually changed. The heat pulse refers to a digital signal for adjusting an energy amount used for driving the electrothermal converter serving as the discharge element when ink is to be discharged from the nozzle on the element substrate. A discharge amount of ink to be discharged from the nozzle can be adjusted by adjusting a pulse width of the heat pulse.

Figure 11A:
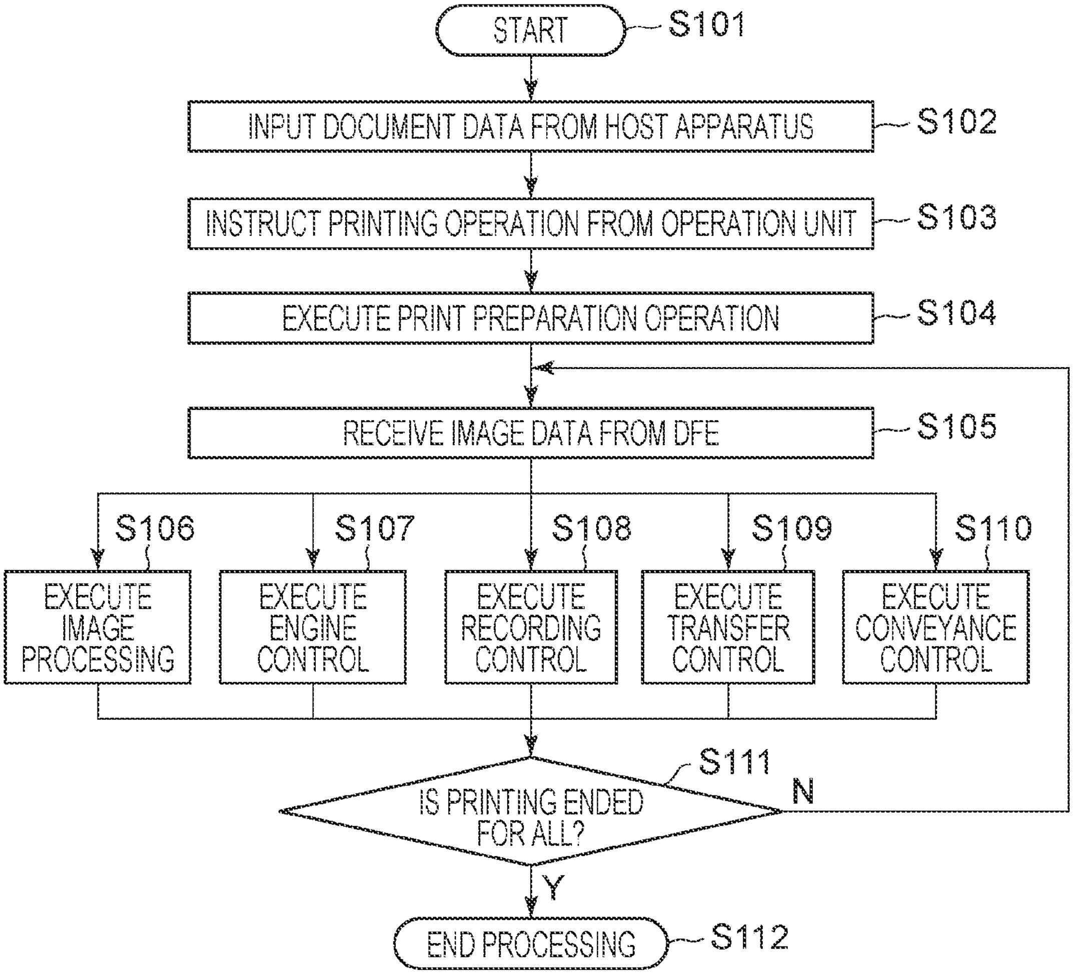
FIGS. 11A and 11B are flowcharts illustrating a flow of printing operation according to the at least one embodiment or other embodiments of the present disclosure.

FIG. 11A is a flowchart of at least one print processing method that may be used with a printing apparatus according to the embodiment or embodiments of the present disclosure. The document data is input from the host apparatus (S101), and a print preparation operation is executed, a print instruction is instructed from an operation unit (S102), and/or recording control is performed (S102). Engine control may be performed in step S103, for example, to instruct printing operation from an operation unit. Upon the end of the preparation, after the engine control (S103), the recording control (S102), and the print instruction from the operation unit (S102), the main controller and the engine controller execute the print preparation operation (S104).

Upon the end of the print preparation, the image processing (S106), the engine control (S107), the recording control (S108), the transfer control (S105), and the conveyance control (S110) are performed in parallel to perform the print operation on a medium such as paper. When the print for a predetermined number of sheets is ended (S111), the processing is ended (S112).

Figure 11B:
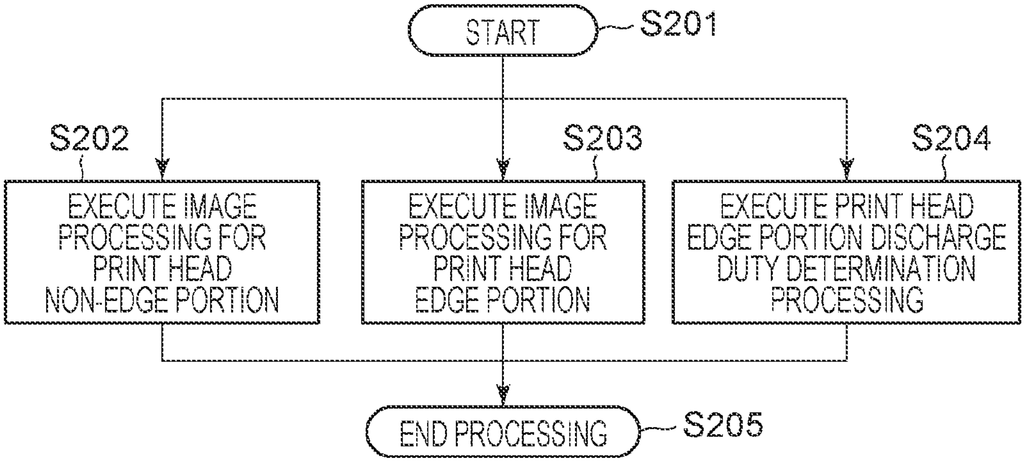
Figure 12:
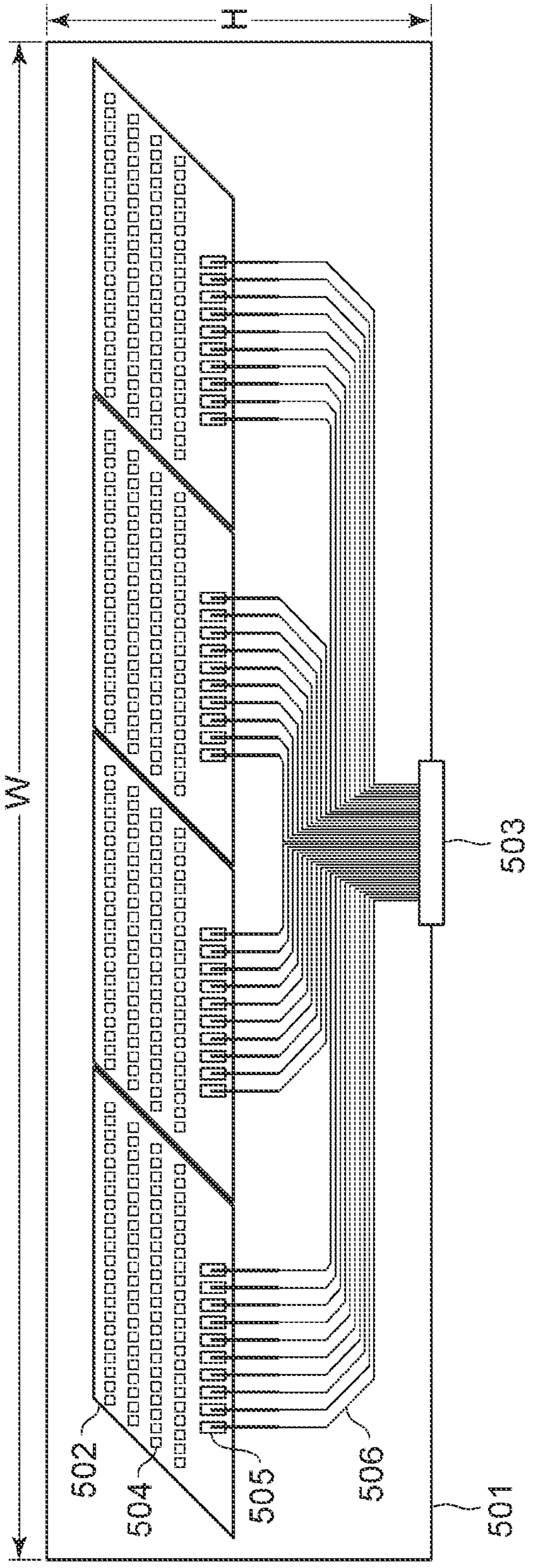
FIG. 12 RELATED ART
FIG. 12 is a schematic diagram of a full-line print head including parallelogram element substrates in related art.

The print preparation operation of the image processing unit is illustrated in FIG. 11B as a part in the print preparation operation in S104 for one or more embodiments of the present disclosure. When the print preparation operation is started (S201), image processing in print head non-edge portions (S202), image processing in print head edge portions (S203), and discharge duty determination processing in the print head edge portions (S204) are executed in parallel. With this configuration, it is determined whether or not the image data is image data that can be printed in the edge portions of the print head.

Figure 6:
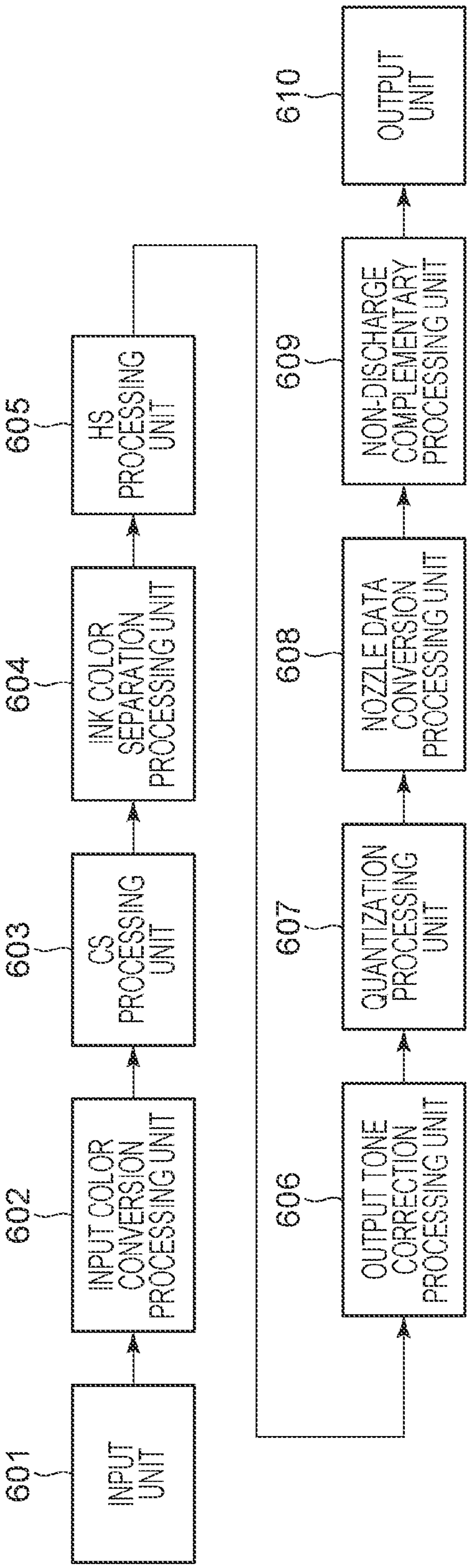
FIG. 6 is an internal block diagram of an image processing unit according to the at least one embodiment or other embodiments of the present disclosure.

FIG. 6 is a block diagram illustrating one or more embodiments of a configuration of image conversion processing, which illustrates a procedure up to a conversion of the input image data into recording data that can be recorded in the recording apparatus or one or more other recording apparatuses of the present disclosure. The recording apparatus includes an input unit 601, an input color conversion processing unit 602, a color shading (CS) processing unit 603, an ink color separation processing unit 604, and a head shading (HS) processing unit 605. In addition, the recording apparatus includes an output tone correction processing unit 606, a quantization processing unit 607, a nozzle data conversion processing unit 608, and a non-discharge complementary processing unit 609. One or more embodiments may include an output unit 610.

First, image data is input to the input unit 601. The image data input herein is 8-bit RGB luminance data represented by three constituent elements of R (red), G (green), and B (blue). Next, in the input color conversion processing unit 602, the input image data is converted into device-dependent RGB 8-bit luminance data with which an image can be reproduced by at least one recording apparatus corresponding to image data on a color space unique to the at least one recording apparatus. For the conversion of the image data, a method in related art such as making a reference to a look-up table (LUT) prestored in a memory can be used.

Next, in the CS processing unit 603, conversion processing for correcting local color difference is applied to the image data converted by the input color conversion processing unit 602. In response to an irregular color detected by at least one inspection apparatus, as described with reference to FIGS. 7A, 7B, and 7C, a correction for reducing the irregular color is performed by using a three-dimensional look-up table for each correction unit (area). By this CS processing, it is possible to reduce a color difference in a multi-order color image using ink of a plurality of colors which is difficult to be fully corrected by the HS processing unit 605 in a subsequent stage. Next, in the ink color separation processing unit 604, the RGB-valued image data to which the CS processing has been applied is separated into 8-bit density data of each of C, M, Y, and K corresponding to ink of four colors of C (cyan), M (magenta), Y (yellow), and K (black) used in the at least one recording apparatus. Herein, a single channel image is generated with regard to each of the ink colors for four planes (for the four colors). In the ink color separation processing unit 604 too, similarly as in the input color conversion processing unit 602, a method in related art such as making a reference to a look-up table (LUT) prestored in a memory can be used.

Since the complementary processing may be performed in some cases between ink colors in edge portion processing of the print head 30 of one or more embodiments of the present disclosure, the look-up table for the ink color separation at the end portions may be changed in the ink color separation processing unit and used to adjust discharge amounts between the ink colors.

The HS processing unit 605 performs correction processing for suppressing an uneven density caused by a variation of discharge characteristics of the respective nozzles provided in the print head on image data composed of CMYK 8-bit density signal values obtained by color separation into a signal for each ink color. In the HS processing unit 605, tone conversion is performed on respective signal values in four channels for each ink color using a one-dimensional look-up table. It is noted that with regard to a three-dimensional look-up table applied in the CS processing unit 603 and a one-dimensional look-up table applied in the HS processing unit 605, a separate conversion table is applied for each of the units of correction respectively formed in units of one or more nozzles. These conversion tables are generated, for example, for each of the units of correction based on a result of a test pattern read by at least one reading apparatus.

Next, in the output tone correction processing unit 606, an output tone correction for a purpose of an adjustment of a dot number for representing a tone on a recording medium is performed on the image data composed of the 8-bit signal values of the respective CMYK colors to which the HS processing has been applied. Herein, the signal value for each ink color is converted using the one-dimensional look-up table. Quantization processing for each plane is implemented in the quantization processing unit 607 for each of the CMYK 8-bit density data on which the output tone correction has been performed. An error diffusion method, a dither method, or the like may be used as a quantization processing method. It is noted that the data after the quantization processing may be binary data or may also be ternary or higher multi-valued data. In the case of the binary data, the data is converted into recording (ON) or non-recording (OFF) of an ink dot in each of pixels. In the case of the ternary or higher multi-valued data, the data is further rasterized by the nozzle data conversion processing unit into binary data of recording (ON) or non-recording (OFF) of the ink dot in each of the pixels. The nozzle data conversion processing unit 608 may utilize a technology in related art in one or more embodiments. For example, a method has been proposed for storing dot arrangements according to quantization levels as a table in advance and determining ON or OFF of the dot arrangement based on the quantization level. Since plural pieces of data for each row of nozzles are present with regard to one color of the ink colors, it is possible to switch data between data corresponding to different rows of nozzles. The non-discharge complementary processing unit 609 performs complementary processing for moving data for which discharge is not to be performed due to a discharge failure of a nozzle to a different row of nozzles.

As described above, various types of conversion processing are applied to the RGB data corresponding to the original image data to be converted into binary data for each of the ink colors which regulates recording from the print head. The converted data is output to an output unit 610, and ink droplets are applied from the print head based on the output image data to form an image on the recording medium.

References will be made to FIGS. 7A, 7B, and 7C again. According to at least the present embodiment of the present disclosure, in order that the discharge amounts from each nozzle of CHIP0 at one end of the print head 30 (herein, a left end) and each nozzle of CHIP5 at the other end (herein, a right end) are increased, an output of either the power source circuit 702 or the heat pulse generation circuit 703 or outputs of both are adjusted. When the discharge amounts of the nozzles in the chips are averaged in chips of CHIP1, CHIP2, CHIP3, and CHIP4, the average is 2.0 ng to 2.2 ng per dot in each of the chips in one or more embodiments. Although CHIP0 and CHIP5 have a same chip configuration such as a diameter of the nozzle as CHIP1, CHIP2, CHIP3, and CHIP4, adjustments are made such that the average of CHIP0 is set at 2.7 ng, and the average of CHIP5 is set as 2.8 ng in one or more embodiments. An ink amount used for recording a predetermined density by forming dots in an area (rectangular frame in FIG. 7B or FIG. 7C) having a predetermined size is 2.7 ng×3=8.1 ng in CHIP0 using three dots (FIG. 7B), and is 2.1 ng×4=8.4 ng in CHIP1 using four dots (FIG. 7C). For example, a case will be considered where in each of CHIP0 and CHIP1, recording is performed based on data of a predetermined same density (at or higher than a halftone) for areas having a same size (for example, the rectangular frame in FIG. 7B or FIG. 7C). In this case, an area of one dot on the recording medium is larger for CHIP0 as compared with CHIP1, and CHIP0 is effective for performing the recording using fewer rows of nozzles than those in other areas as in an edge portion 2 which will be described below.

As described above, substantially equal ink amounts can be discharged per unit area using fewer nozzles in CHIP0 and CHIP5 than those in CHIP1 to CHIP4 on a central side of the print head.

It is noted that the element substrates may have manufacturing dispersion or errors in one or more embodiments, and it is possible to perform correction processing on the image data to correct errors of the discharge amounts due to the dispersion. Although the correction processing can be closely performed up to units of resolution, in a case where changes are made to CHIP0 and CHIP5 to increase the discharge amounts as in FIG. 7A, correction parameters different for each of areas are used as in correction processing areas 1 to 5 for one or more embodiments.

In addition, a configuration has been adopted in which the power source voltage and the heat pulse width are adjusted in units of the element substrate 701 as an example in FIGS. 7A, 7B, and 7C, but a configuration may also be adopted in which the adjustment can be performed in still finer units inside the element substrate 701.

Figure 8:
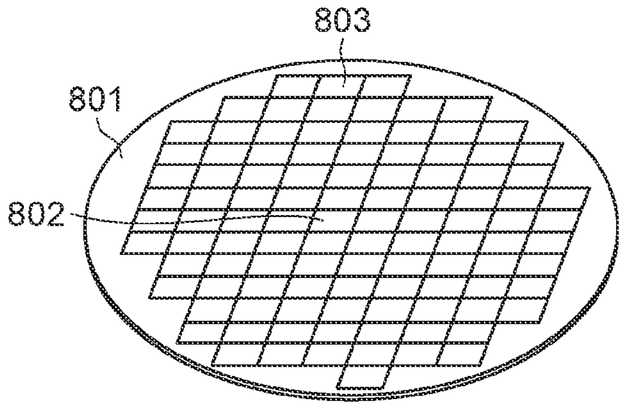
FIG. 8 is a schematic diagram for describing a silicon wafer for one or more embodiments of the present disclosure.

FIG. 8 is a schematic diagram illustrating a situation where recording elements are formed on a silicon wafer 801, and the element substrates are manufactured. Rectangular units as illustrated in FIG. 8 are set as units and cut to obtain the element substrates. As described above, the recording elements may have some variations in characteristics due to manufacturing, and even when a same power source voltage and a heat pulse width are used, there may be some variations in discharge amounts. For example, even in the single silicon wafer 801, an element substrate 802 formed in a position close to a center of the silicon wafer and an element substrate 803 formed in an end position of the silicon wafer tend to have a difference in characteristics. That is, a recording element having a high discharge amount and a recording element having a low discharge amount are formed in the single silicon wafer.

In FIG. 7A, the power source circuit 702 and the heat pulse generation circuit 703 are used to increase the discharge amounts in CHIP0 and CHIP5. However, when the print head 30 is formed by coupling the recording element substrates to each other, similar advantages may also be attained by configuring the print head 30 such that the recording elements originally having the high discharge amounts due to the manufacturing dispersion or errors are arranged in CHIP0 and in CHIP5 located at the end portions.

Figure 9:
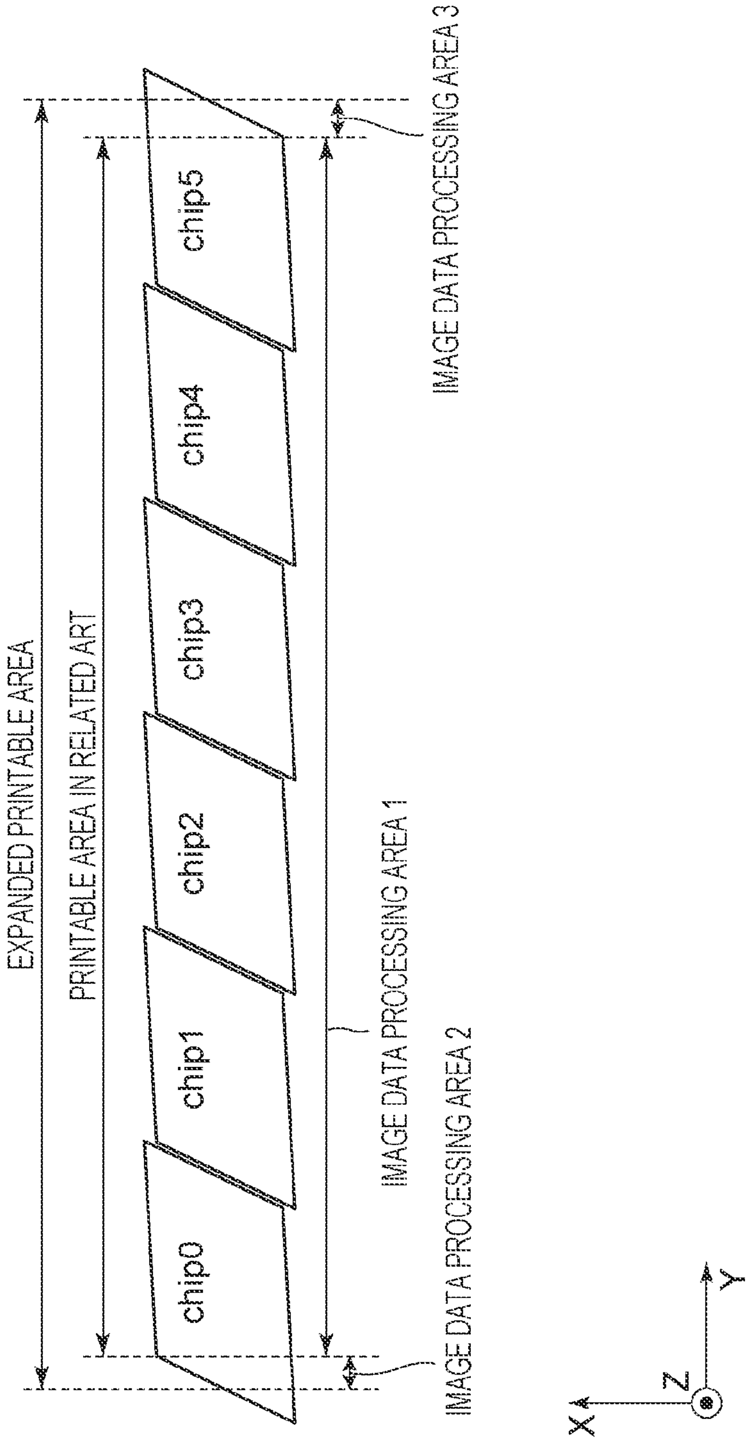
FIG. 9 is a schematic diagram for describing a printable area according to the at least one embodiment or other embodiments of the present disclosure.

FIG. 9 is a schematic diagram for describing a printable area of the print head 30 according to at least one embodiment of the present disclosure.

A printable area where a sufficient number of nozzles are arranged in the X direction corresponds to an image data processing area 1. In addition, printing in an expanded printable area can also be performed in an image data processing area 2 and an image data processing area 3 corresponding to printable areas where the number of nozzles in the X direction is low due to an end portion on one end side in the Y direction of the print head 30 by changing contents of the image data processing.

The contents of the image data processing to be changed in each of the image data processing areas 1 to 3 are, for example, non-discharge complementary processing. Since the number of rows of nozzles satisfying a certain discharge amount and recording speed are present in the image data processing area 1, it is not necessary to perform complementary processing based on adjacent nozzles or complementary processing using another print head 30 of a different ink color in one or more embodiments. On the other hand, by performing the complementary processing based on the adjacent nozzles or the complementary processing using the other print head 30 of the different ink color in the image data processing area 2 and the image data processing area 3, it is possible to satisfy the certain discharge amount and recording speed.

In addition, the discharge amount to be used per unit area is calculated from the image data with regard to the image data processing area 2 and the image data processing area 3. Then, comparison with the dischargeable amount in positions corresponding to the image data processing area 2 and the image data processing area 3 in the recording elements may be performed to determine whether or not printing can be performed before an actual printing operation is to be performed.

Figure 10:
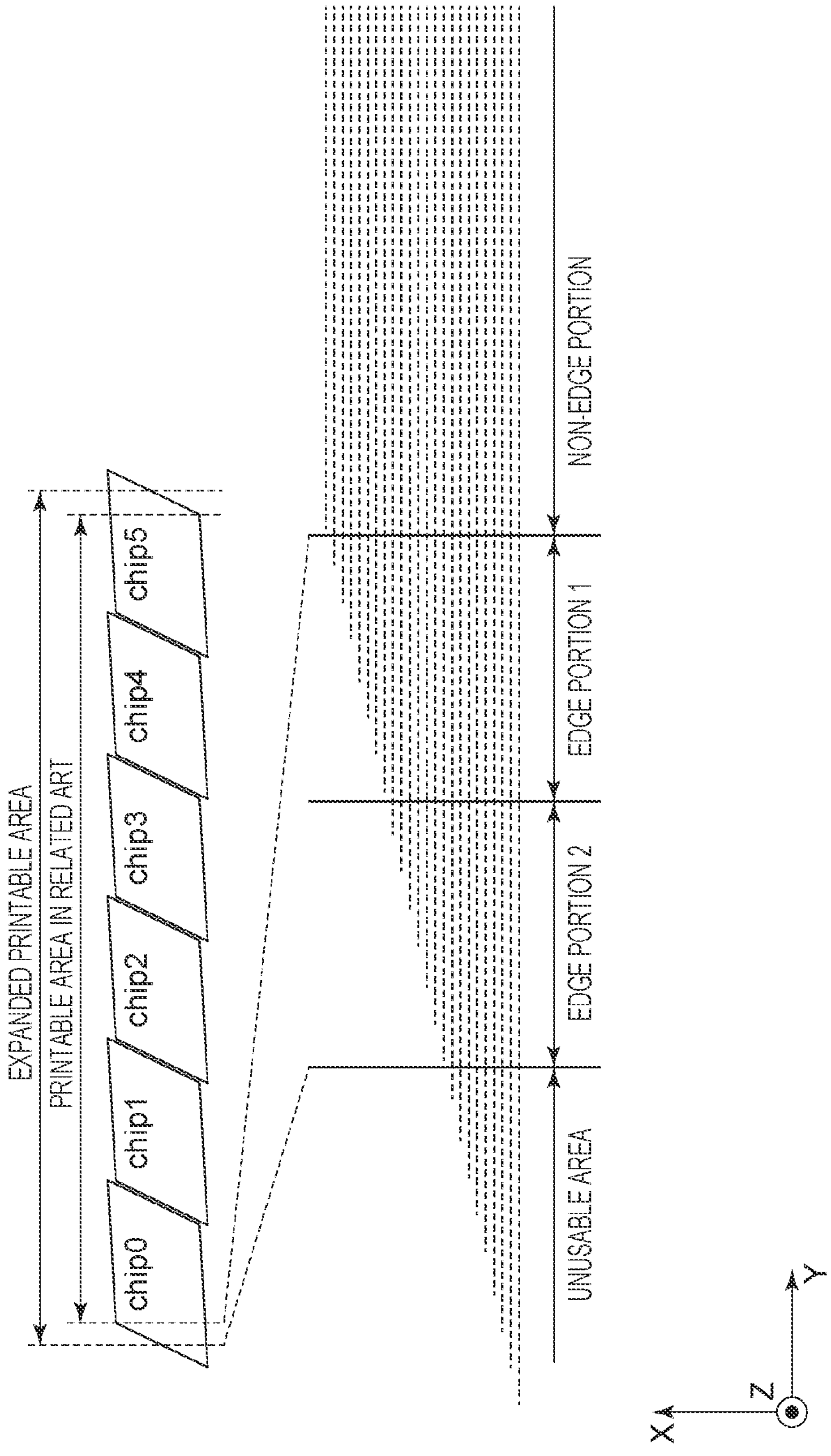
FIG. 10 is a schematic diagram for describing the printable area according to the at least one embodiment or other embodiments of the present disclosure.

FIG. 10 is an expanded view of an area corresponding to the image data processing area 2 of the print head 30 in FIG. 9. As illustrated in FIG. 10, a part corresponding to the image data processing area 2 in FIG. 9 is further divided into two portions including an edge portion 1 and the edge portion 2, and different types of image processing may be performed in the edge portion 1 and the edge portion 2. For example, the complementary processing based on the adjacent nozzles or the complementary processing using the other print head 30 of the different ink color is not performed in the edge portion 1 similarly as in a non-edge portion in one or more embodiments, but the complementary processing based on the adjacent nozzles or the complementary processing using the other print head 30 of the different ink color is performed in only the edge portion 2 in one or more embodiments.

The following conditions are assumed herein for one or more embodiments of the present disclosure. The rows of nozzles are redundantly mounted in the non-edge portion in addition to the rows of nozzles used to satisfy the certain discharge amount and recording speed. The rows of nozzles used to satisfy the certain discharge amount and recording speed are provided in the edge portion 1 with a small number of redundant rows of nozzles. The edge portion 2 is slightly short of the number of the rows of nozzles which satisfy the certain discharge amount and recording speed. For this reason, image processing different from those in the non-edge portion and the edge portion 1 is to be performed in the edge portion 2.

In addition, in CHIP0, an area on one end side (herein, −Y direction) of the print head 30 relative to the edge portion 2 has the number of rows of nozzles lower than that in the edge portion 2, and is an unusable area that is not used for the recording in one or more embodiments. Similarly, in CHIP5 too, an area on +Y direction side relative to an image processing area 3 has an insufficient number of rows of nozzles in one or more embodiments, and is not used for the recording.

In addition, the recording system according to one or more of the aforementioned embodiments described above is configured to perform the recording on the transfer body 2 corresponding to a primary medium to be recorded, and to transfer the image onto a final recording medium such as paper. However, the recording system may be set as a so-called direct printing type recording system in which ink discharged from the print head 30 is directly applied to the recording medium such as paper conveyed in the X direction for one or more embodiments of the present disclosure.

According to the embodiments of the present disclosure, the desired throughput can be satisfied while the wider printable area of the print head is secured than done before.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-106349, filed Jun. 28, 2021, which is hereby incorporated by reference herein in its entirety.

What is claimed is:

1. A recording apparatus comprising:

a print head including a plurality of nozzle rows including an array of nozzles each of which is arranged to discharge ink, and a plurality of substrates on which, for each of the nozzles, an element configured to generate energy used for discharging the ink from the nozzle is provided, wherein a relative movement between the print head and a recording medium is operated in a predetermined direction to perform recording on the recording medium, and a range exists where the nozzles are provided in an intersecting direction which intersects with the predetermined direction varying between the plurality of nozzle rows arranged in the predetermined direction in each of the plurality of substrates, and wherein a number of nozzle rows in a first area on a side of one end of a first substrate closest to one end of the print head in the intersecting direction is set to be lower than a number of nozzle rows on a central side of the print head relative to the first area, and energy for driving the element on the first substrate is set to be larger than energy for driving the element on a second substrate on the central side of the print head relative to the first substrate to set a dot to be formed on the recording medium by the ink discharged from the nozzle in the first area to be larger than a dot to be formed on the recording medium by the ink discharged from the nozzle in the second substrate.

2. The recording apparatus according to claim 1, wherein a number of nozzle rows in a second area further on the one end side relative to the first area of the first substrate is lower than the number of nozzle rows in the first area, and the nozzles in the second area are not used for the recording.

3. The recording apparatus according to claim 1, wherein the number of nozzle rows in an area on the central side of the print head relative to the first area in the first substrate is higher than the number of nozzle rows in the first area.

4. The recording apparatus according to claim 1, wherein the second substrate and the first substrate are adjacent to each other in the intersecting direction.

5. The recording apparatus according to claim 1, further comprising:

a plurality of generation controllers or processors which are configured to generate a signal for driving each element of each of the plurality of substrates and which respectively correspond to the plurality of substrates of the print head, wherein the energy for driving the element of the first substrate is set to be higher than the energy for driving the element of the second substrate by controlling a pulse width of the signal.

6. The recording apparatus according to claim 1, further comprising:

a conveyance unit or conveyor configured to convey the recording medium in the predetermined direction.

7. The recording apparatus according to claim 1, wherein the print head performs the recording on the recording medium based on image data, and the recording apparatus further comprises a correction unit configured to correct a value of the image data for performing the recording using the nozzles in an area on the central side of the print head rather than the nozzles in the first area of the first substrate.

8. A recording apparatus comprising:

a print head including a plurality of nozzle rows including an array of nozzles each of which is arranged to discharge ink, and a plurality of substrates on which, for each of the nozzles, an element configured to generate energy used for discharging the ink from the nozzle is provided, wherein a relative movement between the print head and a recording medium is operated in a predetermined direction to perform recording on the recording medium, and a range exists where the nozzles are provided in an intersecting direction which intersects with the predetermined direction varying between the plurality of nozzle rows arranged in the predetermined direction in each of the plurality of substrates, and wherein a number of nozzle rows in a first area on a side of one end of a first substrate closest to one end of the print head in the intersecting direction is set to be lower than a number of nozzle rows on a central side of the print head relative to the first area, an average of discharge amounts of the respective nozzles of the first substrate is higher than an average of discharge amounts of the respective nozzles of a second substrate on the central side of the print head relative to the first substrate, and a dot number to reproduce a same density in an area with a predetermined size is lower in the second substrate than a dot number to reproduce a same density in an area with a predetermined size in the first substrate.

9. The recording apparatus according to claim 8, wherein a number of nozzle rows in a second area further on the one end side relative to the first area of the first substrate is lower than the number of nozzle rows in the first area, and the nozzles in the second area are not used for the recording.

10. The recording apparatus according to claim 8, wherein the number of nozzle rows in an area on the central side of the print head relative to the first area in the first substrate is higher than the number of nozzle rows in the first area.

11. The recording apparatus according to claim 8, wherein the second substrate and the first substrate are adjacent to each other in the intersecting direction.

12. The recording apparatus according to claim 8, further comprising:

a plurality of generation controllers or processors which are configured to generate a signal for driving each element of each of the plurality of substrates and which respectively correspond to the plurality of substrates of the print head, wherein an energy for driving the element of the first substrate is set to be higher than an energy for driving the element of the second substrate by controlling a pulse width of the signal.

13. The recording apparatus according to claim 8, further comprising:

a conveyance unit or conveyor configured to convey the recording medium in the predetermined direction.

14. The recording apparatus according to claim 8, wherein the print head performs the recording on the recording medium based on image data, and the recording apparatus further comprises a correction unit configured to correct a value of the image data for performing the recording using the nozzles in an area on the central side of the print head rather than the nozzles in the first area of the first substrate.

* * * * *